No. 752,346. PATENTED FEB. 16, 1904.
F. L. LINDEN.
LEADED GLASS MOSAIC.
APPLICATION FILED DEC. 19, 1903.
NO MODEL.

Witnesses,
J. S. Mann,
S. N. Pond.

Inventor,
Frank L. Linden,
By Offield, Towle & Linthicum
Attys.

No. 752,346. Patented February 16, 1904.

UNITED STATES PATENT OFFICE.

FRANK L. LINDEN, OF CHICAGO, ILLINOIS, ASSIGNOR TO LINDEN GLASS COMPANY, OF CHICAGO, ILLINOIS, A FIRM.

LEADED GLASS MOSAIC.

SPECIFICATION forming part of Letters Patent No. 752,346, dated February 16, 1904.

Application filed December 19, 1903. Serial No. 185,879. (No model.)

*To all whom it may concern:*

Be it known that I, FRANK L. LINDEN, a citizen of the United States, residing at Chicago, in the county of Cook and State of Illinois, have invented certain new and useful Improvements in Leaded Glass Mosaics, of which the following is a specification.

My invention relates to that class of manufactures commonly known under the generic title of "art-glass," and more specifically known as "leaded mosaics," which are employed for decorative purposes in a variety of relations, such as in the walls of railway-cars and other situations where either an exterior or an interior ornamental effect is to be produced. In the construction of such ornaments as at present employed the separate pieces or fragments of variously-colored glass are united by connecting leaded strips or ribs to form a mosaic panel, which latter is mounted in a metallic or other bounding frame, the whole being set in a recess in the wall and commonly secured in place by molding overlying the outer marginal portions of the frame. A defect which has hitherto existed in these mosaics as thus constructed resides in the fact that they are not dust and moisture proof, and consequently when exposed to these influences, as is the case, for instance, when they are employed as ornaments in the walls of railway-cars, the dust and moisture beats in through the leaded joints between the glass fragments and collects in the space lying behind the ornament, rotting and otherwise deleteriously affecting the setting.

It is the object of the present invention to improve upon the construction of such ornaments in a way to render them entirely dust and water proof, and this I accomplish through the provision of a protective backing, which completely and effectively seals the back surface of the mosaic without in any way affecting the exposed surface thereof or detracting from its ornamental character and appearance.

My invention will be fully understood when considered in connection with the accompanying drawings, which illustrates a preferred form thereof, and wherein—

Figure 1:
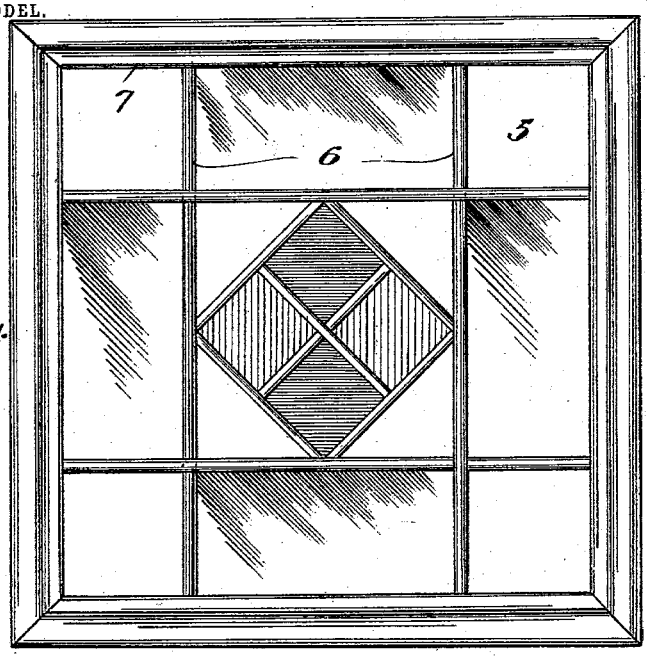
Figure 2:
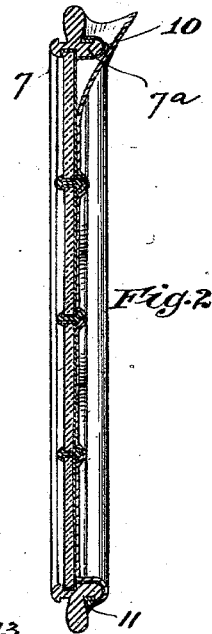
Figure 3:
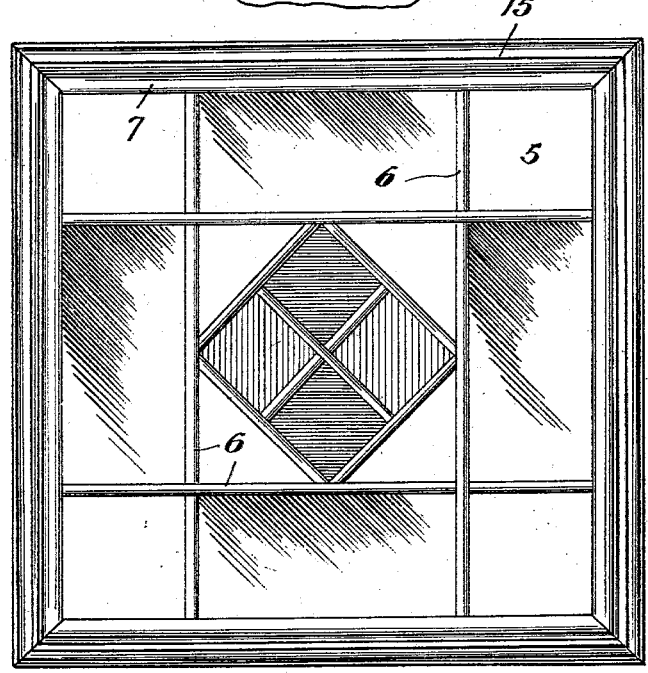

Figure 1 is a face view of a simple or typical form of leaded mosaic made in accordance with my invention. Fig. 2 is a vertical transverse sectional view thereof with the upper portion of the protective backing turned outwardly to better illustrate the manner and means of its application. Fig. 3 is a face view of the mosaic similar to Fig. 1, shown in connection with its setting and the molding by which it may be secured in place; and Fig. 4 is a vertical transverse sectional view through Fig. 3.

Referring to the drawings, 5 designates a series of glass pieces or fragments ordinarily of varying colors, which are set in and connected by grooved leaded ribs 6 to unitedly constitute a mosaic panel, the whole being set in a rectangular bounding-frame, (designated by 7.) The leaded glass mosaic thus formed constitutes a sample of ornaments of its class such as are extensively employed to give an ornamental effect in walls, ceilings, and similar situations. My novel protective covering therefor is applied to the back surface thereof, and in the preferred form herein shown consists of a sheet of thin pliable metal, such as lead, (designated by 8,) which is adhered to the back of the panel by an interposed layer of cement, (designated by 9,) being bent to fit snugly over the intersecting ribs 6 and adhere not only to said ribs, but also to the component panels mounted therein, all as plainly indicated in the sectional views, Figs. 2 and 4. The metal sheet 8 may be, and preferably is, still further united to the ribs by soldering at intervals, which may be conveniently effected by applying to said ribs before the sheet is applied drops of solder, such as indicated at 10 in Fig. 2, and after the cement and protective sheet have been applied the solder may be melted to adheringly unite the protective sheet to the ribs by passing a hot iron over the outer surface of the sheet above the drops of solder, thus melting and spreading the latter. The marginal portions of the protective covering are when applied to a bounding-frame of the cross-sectional form herein shown bent over and snugly fitted to the rearwardly-extending rib 7ª, the joint between the edge of the covering-sheet and the frame being closed by a line of solder, (indicated at 11.) As a further protection against the penetration of dust and moisture through the panel, the joints between the glass sections 5 and the ribs 6 and bounding-frame 7, in which they are mounted, contain a filling of cement, (designated by 12.)

Figure 4:
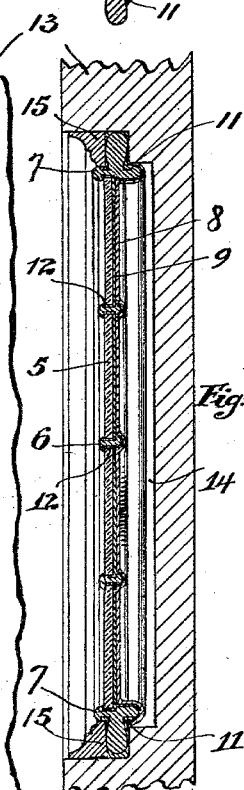

Figs. 3 and 4 illustrate the manner in which a glass mosaic of this character is usually mounted, 13 designating a wooden wall which is recessed or countersunk, as at 14, to receive the panel, which latter is seated therein, with its protected side in rear, and the panel may conveniently be secured in place by strips of molding 15, covering the outer portion of the marginal frame, as clearly shown in Fig. 4.

The advantages of the above-described construction, as already referred to in connection with the stated object of the invention, are that the mosaic is thus rendered both dust and water proof, it being impossible for rain, dust, and dirt to beat in through the same, and the woodwork lying therebehind is thus protected from injury and decay, such as would result from the accumulation of moisture and dirt therein.

I claim—

1. As an article of manufacture, a leaded glass mosaic having applied to the back side thereof a dust and moisture proof covering, substantially as described.

2. As an article of manufacture, a leaded glass mosaic having applied to the back surface thereof a protective covering of pliable sheet metal, substantially as described.

3. As an article of manufacture, a leaded glass mosaic having applied to the back surface thereof a protective covering of sheet material with an intermediate layer of adhesive material, substantially as described.

4. As an article of manufacture, a leaded glass mosaic having applied to the back surface thereof a protective covering of pliable sheet metal bent to fit the plane and raised surfaces of the panels and ribs, respectively, and an intermediate layer of waterproof adhesive material, substantially as described.

5. As an article of manufacture, a dust and moisture proof leaded glass mosaic comprising a bounding-frame containing component panels and grooved connecting-ribs in which said panels are set, a layer of waterproof cement applied to the back of the composite structure, and an outer protective covering of pliable sheet metal applied to the back of the structure and adhered thereto by said cement and by solder connecting it to the bounding-frame and ribs of the mosaic, substantially as described.

FRANK L. LINDEN.

Witnesses:
SAMUEL N. POND,
ERNEST J. WAGNER.